3,099,677
PREPARATION OF METABORATE AND
POLYBORATE ESTERS
Don L. Hunter, Long Beach, Calif., assignor to United
States Borax & Chemical Corporation, Los Angeles,
Calif., a corporation of Nevada
No Drawing. Filed Jan. 21, 1959, Ser. No. 788,040
5 Claims. (Cl. 260—462)

The present application is a continuation-in-part of my application, now abandoned, Serial No. 714,693, filed February 12, 1958.

This invention relates as indicated to the preparation of metaborate and polyborate esters and has more particular reference to a new method for preparing alkyl and aryl metaborate and polyborate esters from orthoborate esters and boric oxide.

Various methods have been proposed for the production of alkyl and aryl metaborate and polyborate esters. These prior art processes have either used high pressure equipment, such as autoclaves and Parr bombs, or they comprised methods and reaction ingredients which resulted in a limited range of metaborates and polyborates.

An object of this invention is to provide a new method for the preparation of alkyl and aryl metaborate esters.

A further object is to provide a new method for the preparation of alkyl and aryl polyborate esters.

A still further object is to provide a novel process for making metaborate and polyborate esters at atmospheric pressure having a reaction rate never before attained by prior art methods.

Other objects will become apparent as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

Broadly stated, this invention comprises the method of converting the orthoborate esters to their corresponding metaborate and polyborate esters which comprises heating at normal atmospheric pressure from about one to about two moles of $B_2O_3$ in the presence of one mole of $(RO)_3B$, wherein RO is a material selected from the class consisting of primary, secondary and tertiary alkoxy groups having from 1 to 6 carbon atoms, phenol and cresols.

Thus, according to the foregoing broadly stated paragraph, it is possible at normal atmospheric pressures to produce metaborate or polyborate esters from the corresponding orthoborate esters depending on the stoichiometry used. In order to do this it is extremely important to note that if it is desired to produce a metaborate ester equimolecular amounts of reaction ingredients must be used. If it is desired to produce a polyborate ester then it is only necessary to increase the amount of $B_2O_3$ to any amount above 1 mole.

As noted above to produce a metaborate ester it is necessary to maintain a precise stoichiometry of equimolecular proportions of $B_2O_3$ to the starting orthoborate ester. Thus any amount of $B_2O_3$ over a 1:1 ratio will result in the production of a polyborate. However, for all practical purposes at least about 1.1 moles of $B_2O_3$ per mole of orthoborate ester should be used to produce polyborates. As for the upper limit of 2 moles of $B_2O_3$ per mole of orthoborate ester this again is limited only by practical considerations. I have found that large amounts of $B_2O_3$ can react with a single mole of orthoborate ester to produce a large molecule of B—O linkages with an occasional RO group on the molecule. However, since the object of producing a polyborate ester is to give $B_2O_3$ organic properties such as solubility in organic solvents it becomes impractical to use more than 2 moles of $B_2O_3$ per mole of orthoborate ester since these organic properties become lost by dilution due to the large proportion of boron and oxygen in the polyborate molecule in relation to the R groups in the molecule.

One mole of a trialkyl or triaryl orthoborate ester heated in the presence of one mole of $B_2O_3$ will react to produce a trialkoxyboroxine or triaryloxyboroxine as shown by the following equation:

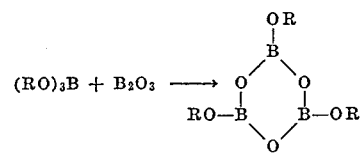

I have been able to establish the fact that the foregoing reaction product has the structure substantially as shown. However, when more than one mole, for example, 1.5 moles of $B_2O_3$ is used the resultant product has a complex polymeric structure which I have not been able to completely ascertain. Although the exact structure has not been determined, nevertheless the fact remains that a polyborate ester is formed when more than one mole of $B_2O_3$ is reacted with one mole of an orthoborate ester as illustrated by the following equation. It will be understood that the final structure as illustrated is a simplified structure and is not necessarily completely correct.

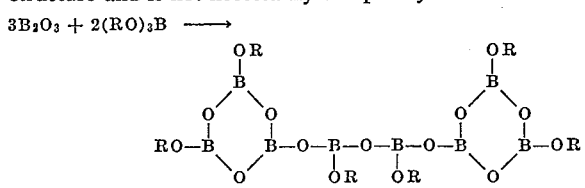

It is also important to note here the significance of the present invention over the prior art processes. The present invention reacts trialkyl or triaryl orthoborates with boric oxide to produce the corresponding metaborate and polyborate esters. This is important for three reasons. First, using an alkyl orthoborate ester as one of the reaction ingredients allows the formation of trialkoxy boroxines having a range of alkyl groups of from 1 to 6 carbon atoms. Secondly, the formation of metaborate and polyborate esters from the corresponding orthoborate esters can be done at normal atmospheric pressures. Thirdly, the reaction of an aryl or alkyl orthoborate ester with boric oxide permits a single step reaction to produce metaborate and polyborate esters without the formation of water, which water, those skilled in the art recognize, would have to be first removed before the metaborate or polyborate ester could be made.

The present reactions are generally carried out at temperatures between about 70 and 150° C., although somewhat higher or lower temperatures may be employed depending upon the particular alkyl or aryl orthoborate present in the reaction mixture.

The products of this invention are excellent fire extinguishing agents and are very active intermediate materials in the production of other organo-boron compounds.

While, as stated above, the aforegoing process of producing metaborate and polyborate esters by heating the corresponding orthoborate ester in the presence of $B_2O_3$ at normal atmospheric pressure is new, I have found that the rate of this reaction can be tremendously increased by conducting the reaction in the presence of an alcohol catalyst.

For example, the reaction time to produce trimethoxyboroxine is about 40 to 50 hours. However, by the addition of about 2% methyl alcohol as a catalyst, the reaction time is lowered to about 7 to 12 hours. The reaction time to produce other metaborate and polyborate esters is correspondingly reduced as with the production of trimethoxyboroxine. From a commercial standpoint the importance of such a catalyst is quite evident.

I have found that at least about 0.25% of the alcohol catalyst, based on the weight of the orthoborate ester, is necessary to speed up the reaction rate. The catalyst may be any primary, secondary, or tertiary alcohol, phenol, cresol, or any polyhydroxy material, such as glycerol, glycol, erythritol, pentaerythritol, arabitol, mannitol, sorbitol, glucose, fructose, mannose, etc.

In the preferred embodiment of my invention I use as the catalyst primary, secondary and tertiary alcohols having from 1 to 18 carbon atoms, and polyhydroxy materials having from 2 to 6 carbon atoms. The economics and commercial availability of alcohols having from 1 to 18 carbon atoms and polyhydroxy materials having from 2 to 6 carbon atoms, make these materials more desirable. However, it will be understood that any primary, secondary, tertiary alcohol, and any polyhydroxy material is useable as a catalytic material in the present invention.

As stated above, at least about 0.25% of the catalyst based on the weight of the orthoborate ester is necessary to speed up the time of the reaction. However, any amount over this may be used. The upper limits of catalyst used will be dictated by economics and the desired degree of purity of the metaborate or polyborate ester produced. Generally, I prefer to use from about 1% to 5% of the catalyst.

It will also be noted that if a catalyst is desired to speed up the reaction it can also be obtained directly from the orthoborate ester used in the reaction, rather than by adding additional alcohol or phenol to the reaction mixture. For example, substantially pure trimethyl borate or triphenyl borate can be partially hydrolyzed to give free methyl alcohol or phenol and ester. These materials when heated in the presence of boric oxide will have a much faster rate of reaction since the free alcohol or phenol which was produced by the partial hydrolysis acts as the catalytic agent.

The following examples set forth certain embodiments of the invention that are not to be construed as limiting the same.

*Example I*

Into a one liter three-necked round-bottom flask equipped with a motor stirrer, water condenser and pot thermometer were added 207.8 grams (2 moles) of trimethyl borate and 139.3 grams (2 moles) of −60 mesh boric oxide. Heat was applied with an electrical heating mantle and stirring was begun. Refluxing began at 70° C. and the pot temperature rose steadily and at the end of about 40 hours the temperature remained constant at 122° C. The heat was decreased and stirring was continued for about another hour at 110° C. The resulting reaction mixture was allowed to cool and was filtered through a Buchner funnel which had Celite filter aid packed on top of the filter paper.

The filtrate was 331 grams (93.5% yield) of a colorless, slightly viscous liquid which analyzed 18.56% boron (theoretical 18.70%).

*Example II*

The foregoing experiment was repeated except that 4.2 grams of methanol were added as a catalyst. In this case the reaction was complete at about 12 hours instead of 40 hours as in Example I.

The yield was 329 grams (93%) of a colorless, slightly viscous liquid which analyzed 18.47% boron.

Thus, it will readily be seen that in both Examples I and II substantially the same product is formed except in the case of the use of the catalyst the reaction was completed in 12 hours instead of 40 hours.

*Example III*

Using the apparatus of Example I, 103.9 grams (1 mole) of trimethyl borate, 69.6 grams (1 mole) of −60 mesh boric oxide and 1.0 gram of methanol were added to the reaction pot. Heat and stirring were applied and refluxing began at 70° C. After 10 hours the pot temperature rose to 124° C., with refluxing, and remained constant. The temperature was lowered to about 100° C. and stirring continued for about an hour without refluxing. The reaction mixture was filtered as in the aforegoing examples. The filtrate was a colorless, slightly viscous liquid which weighed 157 grams (90.5% yield) and which analyzed 18.6% boron.

*Example IV*

Example III was repeated except in this instance 2.1 grams of ethylene glycol were used as the catalyst. After 5 hours the pot temperature reached 118° C. and remained constant. The yield was 89% and was a colorless, slightly viscous liquid which analyzed 18.54% boron.

*Example V*

Example III was repeated except 2.1 grams of tertiary butyl alcohol were used as the catalyst. The reaction was completed after 9 hours at a temperature of 119° C. The yield was 89% and was a colorless, slightly viscous liquid which analyzed 18.52% boron.

*Example VI*

Using the apparatus of the foregoing examples 188.1 grams (1 mole) of triisopropyl borate, 3.8 grams of isopropanol, and 69.64 grams of −60 mesh boric oxide were added to the reaction pot. Heat was applied with an electrical mantle and stirring was begun. The temperature of the reaction was maintained at 110°–120° C. without reflux for 18 hours. The reaction mixture was allowed to cool to 60° C. and 500 ml. of 20°–40° C. petroleum ether was added. Stirring was continued for another 15 minutes and the mixture was filtered as in the previous examples. The filtrate was cooled for 8 hours and the ester crystallized out of solution. The ester was then filtered and washed with cold petroleum ether and dried in a vacuum desiccator. Two further yields of ester were obtained from the original filtrate by reducing the volume and cooling. The total yield of ester was 86% and comprised a white, feathery solid which analyzed 12.53% boron (theoretical 12.60%). The melting point of the ester was 46.5–49.0° C.

*Example VII*

Example VI was repeated using 9.4 grams isopropanol catalyst. The reaction mixture was heated at 90°–110° C. for 4½ hours. Analysis of the ester showed 12.10% boron (theoretical 12.60%).

*Example VIII*

Using the same equipment as in the aforegoing examples 3407 grams (14.8 moles) of tri-n-butyl borate, 68 grams of n-butanol and 1031 grams (14.8 moles) of −60 mesh boric oxide were placed in the reaction pot. The reaction mixture was heated with stirring to 110–130° C. for 8 hours. The resultant material was allowed to cool and was then filtered. The filtrate was 4249 grams (93.4% yield) of a substantially colorless, slightly viscous liquid which analyzed 10.40% boron (theoretical 10.83%).

*Example IX*

Using apparatus as in the previous examples 314.3 grams (1 mole) of tri-n-hexyl borate, 69.6 grams (1 mole) of −60 mesh boric acid and 6.3 grams of n-hexanol were added to the reaction pot. The mixture was heated to 130°–140° C. for 11 hours. The resultant product after filtering was 357 grams (93.5% yield) of a colorless, slightly viscous liquid which analyzed 8.29% boron (theoretical 8.46%).

Example X

Using apparatus as in the previous examples, 230.2 grams (1 mole) of tri-n-butyl borate, 69.6 grams (1 mole) of —60 mesh boric oxide and 11.5 grams of methanol were placed in the reaction pot. Heat and stirring were applied and the reaction temperature was maintained at 110°–130° C. for 6 hours. The reaction mixture was then cooled to 60° C. and filtered. The yield was 94%, and consisted of an almost colorless, slightly viscous liquid which analyzed 10.76% boron (theoretical 10.83%).

Example XI

Using equipment as in the previous examples, 290.1 grams (1 mole) of triphenyl borate, 69.6 grams (1 mole) of boric oxide and 5.8 grams of phenol as catalyst were added to the reaction vessel. Stirring was applied and the mixture heated. The temperature was maintained at 130°–150° C. for 14 hours. The reaction mixture was allowed to cool slightly and 500 ml. of 20°–40° C. petroleum ether was added and stirred to effect homogeneity. The solution was then filtered and the filtrate allowed to sit in the cold for about 8 hours, whereupon the metaborate ester crystallized as a white solid. The ester was then filtered and dried in a vacuum oven. The yield was 243 grams (68%) and the boron analysis gave 9.80% boron (theoretical 9.02%). The material had a melting point of 96°–120° C.

Example XII

Example XI was repeated only a substituted phenoxy compound was used. 332.1 grams (1 mole) of tri-o-cresyl borate, 69.6 grams (1 mole) boron oxide and 6.6 grams methanol catalyst were reacted. The reaction was completed in 12 hours at 130–150° C. The ester was crystallized as in Example XI, filtered and dried in a vacuum oven. The yield was 314 grams (78% yield) and had a boron analysis of 8.85% (theoretical 8.80%).

Example XIII

Using the apparatus and technique of Example I, 103.9 grams (1 mole) of trimethyl borate was heated with 87.05 grams (1.25 moles) of $B_2O_3$. The resultant polyborate was a colorless viscous liquid having a boron content of 19.71% (theory=19.82% B).

Example XIV

Using the apparatus of Example I and 3 grams of isopropanol as the catalyst, 188.1 grams (1 mole) of tri-n-propyl borate was heated in the presence of 92.62 grams (1.33 moles) of $B_2O_3$. The resultant polyborate was a colorless viscous liquid having a boron content of 14.09% (theory=14.15% B).

Example XV

Example VIII was repeated, reacting 230.2 grams (1 mole) of tri-n-butyl borate with 80.08 grams (1.15 moles) of $B_2O_3$. Four grams of n-butanol were added as the catalyst. The resultant polyborate was a colorless viscous liquid having a boron content of 11.63% (theory= 11.51% B).

Example XVI

Example XI was repeated using 290.13 grams (1 mole) of triphenyl borate and 92.62 grams (1.33 moles) of $B_2O_3$. The resultant polyborate was a white crystalline solid having a boron content of 10.42% (theory=10.38% B).

Other modes of applying the principle of the invention may be employed, change being made as regards the details described, provided the features stated in any of the following claims or the equivalent of such be employed.

I, therefore, particularly point out and distinctly claim as my invention:

1. The method of producing triphenoxyboroxine which comprises heating at normal atmospheric pressure equimolecular weights of $B_2O_3$ and triphenyl borate in the presence of from about 0.25% to about 5% of a catalyst, said catalyst selected from the group consisting of primary, secondary and tertiary alcohols having from 1 to 18 carbon atoms, phenol, cresols, glycerol, glycol, erythritol, pentaerythritol, arabitol, mannitol, sorbitol, glucose, fructose and mannose.

2. The method of producing tricresoxyboroxine which comprises heating at normal atmospheric pressure equimolecular weights of $B_2O_3$ and tri-o-cresyl borate in the presence of from about 0.25% to about 5% of a catalyst, said catalyst selected from the group consisting of primary, secondary and tertiary alcohols having from 1 to 18 carbon atoms, phenol, cresols, glycerol, glycol, erythritol, pentaerythritol, arabitol, mannitol, sorbitol, glucose, fructose and mannose.

3. The method of producing phenyl polyborate which comprises heating at normal atmospheric pressure from about 1.1 to about 2 moles of $B_2O_3$ per mole of triphenyl borate in the presence of from about 0.25% to about 5% of a catalyst, said catalyst selected from the group consisting of primary, secondary and tertiary alcohols having from 1 to 18 carbon atoms, phenol, cresols, glycerol, glycol, erythritol, pentaerythritol, arabitol, mannitol, sorbitol, glucose, fructose and mannose.

4. The method of preparing triaryloxyborozines having the general formula

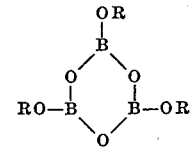

which comprises heating at normal atmospheric pressure equimolecular weights of $B_2O_3$ and $(RO)_3B$ in the presence of from about 0.25% to about 5% of a catalyst selected from the group consisting of primary, secondary and tertiary alcohols having from 1 to 18 carbon atoms, phenol, cresols, glycerol, glycol, erythritol, pentaerythritol, arabitol, mannitol, sorbitol, glucose, fructose and mannose, wherein RO is phenoxy.

5. The method of preparing triaryloxyboroxines having the general formula

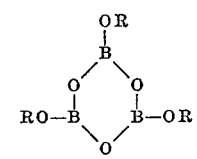

which comprises heating at normal atmospheric pressure equimolecular weights of $B_2O_3$ and $(RO)_3B$ in the presence of from about 0.25% to about 5% of a catalyst selected from the group consisting of primary, secondary and tertiary alcohols having from 1 to 18 carbon atoms, phenol, cresols, glycerol, glycol, erythritol, pentaerythritol, arabitol, mannitol, sorbitol, glucose, fructose and mannose, wherein RO is a cresoxy group.

References Cited in the file of this patent

UNITED STATES PATENTS 2,891,086    Schechter              June 16, 1959